United States Patent [19]
Hikmet

[11] Patent Number: 5,333,074
[45] Date of Patent: Jul. 26, 1994

[54] DISPLAY DEVICE COMPRISING LIQUID CRYSTALLINE MATERIAL LOCALLY FORMED INTO A POLYMER NETWORK

[75] Inventor: Rifat A. M. Hikmet, Eindhoven, Netherlands

[73] Assignee: U.S. Philips Corporation, New York, N.Y.

[21] Appl. No.: 987,912

[22] Filed: Dec. 4, 1992

[30] Foreign Application Priority Data

Dec. 9, 1991 [EP] European Pat. Off. ........ 91203208.3

[51] Int. Cl.⁵ .............................................. G02F 1/13
[52] U.S. Cl. ...................................... 359/51; 359/103
[58] Field of Search .......................... 359/51, 106, 103

[56] References Cited

U.S. PATENT DOCUMENTS

| | | | |
|---|---|---|---|
| 4,688,900 | 8/1987 | Doane et al. | 350/347 |
| 5,194,973 | 3/1993 | Isogai et al. | 359/51 |
| 5,204,763 | 4/1993 | Hikmet | 359/51 |
| 5,208,687 | 5/1993 | Yoshida et al. | 359/51 |
| 5,210,630 | 5/1993 | Heynderickx et al. | 359/106 |
| 5,262,882 | 11/1993 | Hikmet | 359/51 |

FOREIGN PATENT DOCUMENTS

| | | |
|---|---|---|
| 264667 | 4/1988 | European Pat. Off. . |
| 0275999 | 7/1988 | European Pat. Off. . |
| 0313053 | 4/1989 | European Pat. Off. ............ 359/51 |
| 451905 | 10/1991 | European Pat. Off. . |
| 2841338 | 11/1979 | Fed. Rep. of Germany . |
| 2-075689 | 3/1990 | Japan ................................ 359/106 |
| 3-288823 | 12/1991 | Japan ................................ 359/106 |

*Primary Examiner*—Anita P. Gross
*Attorney, Agent, or Firm*—Norman N. Spain

[57] ABSTRACT

A display device comprising a display cell consisting of a substrate which is formed by two oppositely located plates whose facing sides are provided with electrode layers to which an orientation layer is applied and a sealing material which is provided between the end portions of the plates, a liquid crystalline material being filled into the space between the plates and the sealing material. In said display device, the liquid crystalline material is locally formed into a polymer network in accordance with a desired pattern. By virtue thereof, the desired pattern of picture elements can be designed with a substantial degree of freedom because it is possible to locally raise the switching threshold of the liquid crystalline material if image formation is not desired at locations where electrodes or conductor patterns cross each other.

5 Claims, 2 Drawing Sheets

DISPLAY DEVICE COMPRISING LIQUID CRYSTALLINE MATERIAL LOCALLY FORMED INTO A POLYMER NETWORK

BACKGROUND OF THE INVENTION

The invention relates to a display device with a display cell which comprises a substrate which is formed by two oppositely located plates whose facing sides are provided with electrode layers to which an orientation layer is applied and a sealing material which is provided between the end portions of the plates, and a liquid crystalline material provided in the space between the plates and the sealing material.

The invention also relates to a method of manufacturing a display device with a display cell which comprises a substrate which is formed by two oppositely located plates whose facing sides are provided with electrode layers to which an orientation layer is applied and a sealing material which is provided between the end portions of the plates, and a liquid crystalline material provided in the space between the plates and the sealing material.

Such a device can be used, for example, in alphanumeric, datagraphic display devices, in particular in passive displays. In such devices at least one of the substrates and the associated electrode layer consist of a transparent material. The other substrate may have a reflective effect or also consists of a transparent material.

A liquid crystal display device comprises a cell having switchable liquid crystalline material between two flat substrates on which electrical conductor tracks and electrodes may be located which can be used to switch the liquid crystalline material between an "on" and an "off" state in accordance with a desired pattern. The electrode layers consist of material which is transparent to visible light, for example tin oxide and/or indium oxide. To provide the molecules of the liquid crystalline material with a parallel (homogeneous), perpendicular (homotropic) or tilted preferred orientation, frequently, orientation layers are disposed between a substrate having conductor tracks and the switchable liquid crystalline material. Polarizers may be arranged in front of and behind the display cell, for example in such a way that they are crossed and do not transmit light. Such a display device is described in, for example, European Patent Application EP-A1-0264667. A display device cannot only operate through rotation of the polarization direction of transmitted or reflected light but also through selective light scattering as described in, for example, U.S. Pat. No. 4,688,900.

In the manufacture of the known display devices care must be taken that no electric fields are formed between oppositely located conductive layers at locations where the formation of an image is not desired. This can be achieved by means of the design of the electrode pattern and the associated conductor tracks running to contact points on the periphery of the device or by means of a device in which the pixels are electrically driven at different instants. Due to this, the possibility of displaying picture elements is limited or use must be made of a complicated electric drive.

SUMMARY OF THE INVENTION

It is an object of the invention to provide, inter alia, a simple display device, in particular, a passive display device in which the desired pattern of picture elements can be designed with a substantial degree of freedom. A further object of the invention is to provide a display cell in which the number of separate electrodes and the number of conductor tracks is as small as possible. The invention further aims at providing a simple and efficacious method of manufacturing such a display device.

These objects are achieved by a display device as described in the opening paragraph, which display device is characterized according to the invention in that the liquid crystalline material comprises polymerizable liquid crystalline molecules having reactive groups and in that the liquid crystalline material is locally formed into a polymer network in accordance with a desired pattern. Preferably, the liquid crystalline material is immobilized in an oriented state at the location of the network and, in the absence of an electric field, no image is visible between the electrodes in the display device.

A very simple and effective display device is obtained in accordance with the invention, in that one of the plates is provided with patterned electrodes for driving picture elements in the display cell, and in that the other plate is provided with a continuous counterelectrode.

In an embodiment accordance with the invention, the object of providing a method of manufacturing a display device is achieved by a method as described in the opening paragraph, which method is characterized in that the liquid crystalline material comprises polymerizable liquid crystalline molecules and in that the liquid crystalline material is locally formed into a polymer network in accordance with a desired pattern by exposure to actinic radiation via a mask. In an alternative embodiment of the method, use is made of a moving light beam.

In the preferred embodiment of the device in accordance with the invention, the display cell has a homogeneous composition and presents no image in the "off" state. As the switching threshold in the part of the cell which is polymerized in accordance with a pattern is higher than in the remaining part of the cell, it is possible to switch "on" picture elements only at locations where no network is formed, even when the electrodes or conductor tracks cross each other elsewhere. During switching, the orientation of the molecules is changed only at the location of the desired picture elements.

In European Patent Application EP-A2-0275999, a description is given of a scattering type of display device comprising a display cell in which liquid crystalline molecules are present in a polymer network. The network itself does not consist of molecules having liquid crystalline properties. During the formation of the network a part of the liquid crystalline molecules is oriented in accordance with a desired pattern. By virtue thereof, a permanent image can be displayed in a part of the display device, without it being necessary to drive the picture elements by means of electrodes. The possibility of providing a display cell comprising liquid crystalline material having locally differing switching thresholds is not described in said Application. Besides, the display cell described therein is a two-phase system and said display cell can only be used for a scattering type of display device.

In European Patent Application EP-A1-0451905, a description is given of a display cell comprising a liquid crystalline material which consists of a polymerized liquid crystalline material and a low-molecular liquid crystalline material. In said Application, however, the possibility of providing a simplified display device by means of a patterned network is not mentioned.

DETAILED DESCRIPTION OF THE INVENTION

Figure 1:
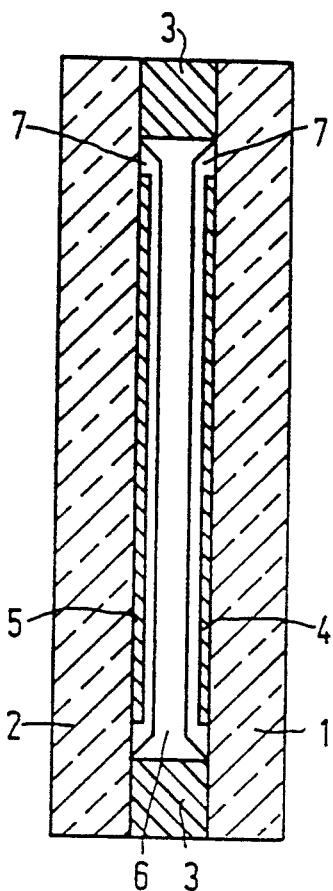
FIG. 1 is a diagrammatic cross-sectional view of a display cell in accordance with the invention.

The invention will now be explained in greater detail by reference to an exemplary embodiment and the figures of the drawing.

Exemplary Embodiment

In FIG. 1, reference numerals 1 and 2 refer to two oppositely located light-transmitting plates which will hereinafter be referred to as substrates and whose facing sides are provided with electrode layers 4 and 5 of, for example, $In_2O_3.SnO_2$. The electrode layers are provided with orientation layers 7, for example of polyimide silane, by means of which the liquid crystalline material 6 can be oriented between the electrode layers. The cell is manufactured by arranging the thus formed substrates carrying electrode layers and orientation layers opposite each other, after which the aperture is closed with, for example, an annular member and the space between the substrates and the ring 3 is filled with liquid crystalline material 6. In practice, an adhesive layer of an epoxy compound can be used instead of the ring 3 shown.

It is possible to provide an orientation layer on one or both sides of the cell, i.e. on one or both substrates. For this purpose, frequent use is made of polymer layers of, for example, polyethylene or polyimide, which layers are rubbed in one direction with, for example, a non-fluff cloth. Another type of orientation layer consists of a layer of silicon oxide which is vapour-deposited at an angle. In accordance with the example, polarizers, not shown in FIG. 1, are arranged in front of and behind the cell in such a way that they are crossed and do not transmit light. In a manner which is known per se, the display device can be complemented with a light source or reflector and electric drive means, which are not shown in FIG. 1.

Figure 2:
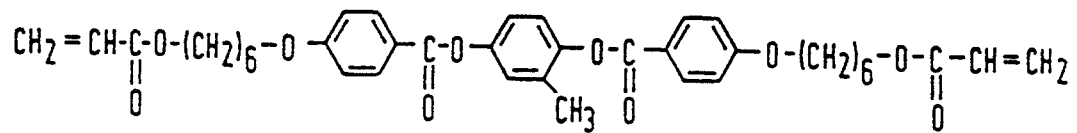
FIG. 2 shows the structural formula of a polymerizable liquid crystalline material.
Figure 3:
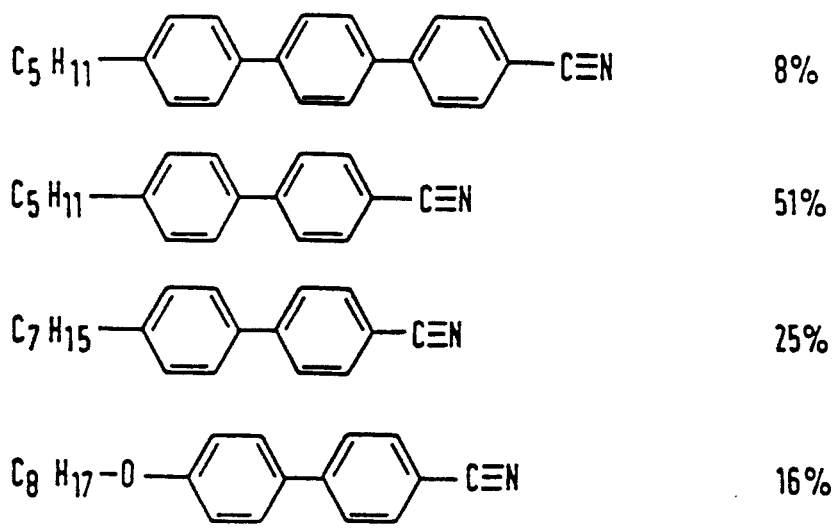
FIG. 3 shows the structural formulae of the components of a mixture of non-reactive liquid crystalline materials, and FIG. 4 diagrammatically shows a pattern of electrodes and conductor tracks in a display cell in accordance with the invention.

A mixture of liquid crystalline materials was manufactured from 10% by weight of a reactive (polymerizable) liquid crystalline material, 88% by weight of a non-reactive (non-polymerizable) liquid crystalline material and 2% by weight of the photosensitive initiator 2,2-dimethoxy-2-phenyl-acetophenone. The diacrylate compound C6M, the structural formula of which is shown in FIG. 2, was used as the reactive liquid crystalline material. The mixture E7 supplied by BDH chemicals LTD., whose composition in % by weight is shown in FIG. 3, was used as the non-reactive liquid crystalline material.

In accordance with a method which is known per se, a cell was manufactured by arranging the substrates 1 and 2 carrying electrode layers 4 and 5 and orientation layers 7 opposite each other and providing the above-described mixture of switchable liquid crystalline material 6 between said substrates. Glass fibres having a diameter of 7.2 μm, serving as spacers, were provided between the substrates. The cell was sealed in a customary manner using epoxide resin adhesive 3 which was provided along the edges of the cell. The cell was irradiated via a mask having a desired pattern with UV light to cure the diacrylate compound C6M. The intensity of said UV light was 0.2 mW/cm² at the location of the liquid crystalline material 6. In said curing process a polymer network was formed in which the non-reactive material was dispersed. In the exposed parts of the cell the switching threshold of the liquid crystalline material is raised, i.e. a greater electric field strength is required to reorient the molecules between the electrode layers.

Figure 4:
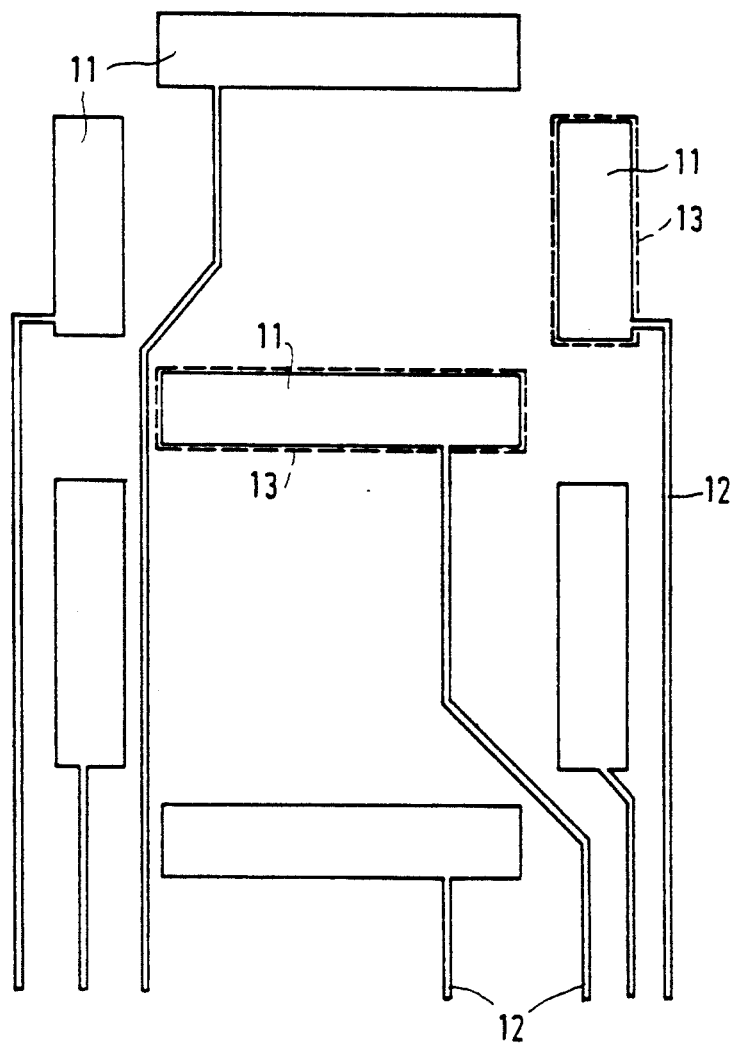

In accordance with the example, one of the electrode layers 4,5 was constructed as a continuous, uninterrupted layer of $In_2O_3.SnO_2$ extending over the entire surface of the cell. The other electrode layer was constructed in accordance with a pattern, as diagrammatically shown in FIG. 4, and comprises a plurality of electrodes 11 and conductor tracks 12. The electrodes correspond to the picture elements of the cell. It is undesirable for the molecules of the liquid crystalline material to be oriented at the location of the conductor tracks. At the location of some of the electrodes a picture element 13 is diagrammatically shown. Within the dotted lines the liquid crystalline material is not exposed and, hence, has remained switchable. Outside the dotted lines the material is exposed and the switching threshold raised. By applying a suitable electric voltage the picture element 13 can be made visible while the associated conductor track remains invisible.

The display device in accordance with the invention can be designed and manufactured in a simple manner because it has been made possible to locally vary the switching threshold of the liquid crystalline material in the display cell. The display device in accordance with the invention may comprise a flat display cell, but is particularly suitable for use with a curved or flexible display cell.

I claim:

1. A display device with a display cell which comprises a substrate which is formed by two oppositely located plates whose facing sides are provided with electrode layers to which an orientation layer is applied and a sealing material which is provided between the end portions of the plates, a liquid crystalline material being provided in the space between the plates and the sealing material, characterized in that the liquid crystalline material comprises polymerizable liquid crystalline molecules and in that the liquid crystalline material is locally formed into a polymer network in accordance with a desired pattern.

2. A display device as claimed in claim 1, characterized in that the liquid crystalline material is immobilized in an oriented state at the location of the network.

3. A display device a claimed in claim 2, characterized in that one of the plates is provided with patterned electrodes for driving picture elements in the display cell, and in that the other plate is provided with a continuous counterelectrode.

4. A display device as claimed in claim 1, characterized in that one of the plates is provided with patterned electrodes for driving picture elements in the display cell, and in that the other plate is provided with a continuous counterelectrode.

5. A method of manufacturing a display device with a display cell which comprises a substrate which is formed by two oppositely located plates whose facing sides are provided with electrode layers to which an orientation layer is applied and a sealing material which is provided between the end portions of the plates, a liquid crystalline material being filled into the space between the plates and the sealing material, characterized in that the liquid crystalline material comprises polymerizable liquid crystal molecule groups is selected, and in that the liquid crystalline material is locally formed into a polymer network in accordance with a desired pattern by means of exposure to actinic radiation via a mask.

* * * * *